United States Patent [19]

Fuller

[11] Patent Number: 4,485,991

[45] Date of Patent: Dec. 4, 1984

[54] ROLLABLE AIRFOIL

[76] Inventor: Brian L. Fuller, 1167 Danner St., SE., Atlanta, Ga. 30316

[21] Appl. No.: 509,795

[22] Filed: Jul. 1, 1983

[51] Int. Cl.³ .............................................. B64C 3/56
[52] U.S. Cl. ...................... 244/49; 244/123; 244/219; 52/108; 416/240; 416/142
[58] Field of Search ................. 244/45 R, 49, 46, 218, 244/123, 138 A, 173; 416/240, 142, 88, 84, 87, 89; 52/84, 108, 222, 2; 242/54 A; 138/119; 33/137–138

[56] References Cited

U.S. PATENT DOCUMENTS

| | | | |
|---|---|---|---|
| 1,539,954 | 6/1925 | Respess | 244/123 |
| 1,947,392 | 2/1934 | Guntermann et al. | 33/137 R |
| 2,406,625 | 8/1946 | Oglesby | 244/45 R |
| 3,065,799 | 11/1962 | McCarty, Jr. | 416/88 |
| 3,117,744 | 1/1964 | Roman | 416/87 |
| 3,298,142 | 1/1967 | Isaac | 52/108 |
| 3,300,910 | 1/1967 | Isaac | 52/108 |
| 3,386,220 | 6/1968 | Staats | 52/222 |
| 3,508,587 | 4/1970 | March | 52/108 |
| 3,743,440 | 7/1973 | Moore | 416/84 |

FOREIGN PATENT DOCUMENTS 166460  7/1921  United Kingdom ................. 416/84

Primary Examiner—Galen L. Barefoot
Attorney, Agent, or Firm—James B. Middleton

[57] ABSTRACT

A rollable airfoil, and aircraft for utilizing the airfoil. The airfoil is made of an upper skin having a cambered configuration and formed of a material having sufficient elasticity that the camber can be broken and the skin rolled into a coil. The lower skin is straight to provide the desired flat under surface of an airfoil, and to pull the edges of the upper skin towards each other to assist in maintaining the camber. The lower skin is stretchable to allow the upper skin to be flattened for rolling. A filler material, such as an expanded plastic, can fill the space between the upper skin and lower skin to dampen vibration.

8 Claims, 6 Drawing Figures

U.S. Patent     Dec. 4, 1984     4,485,991
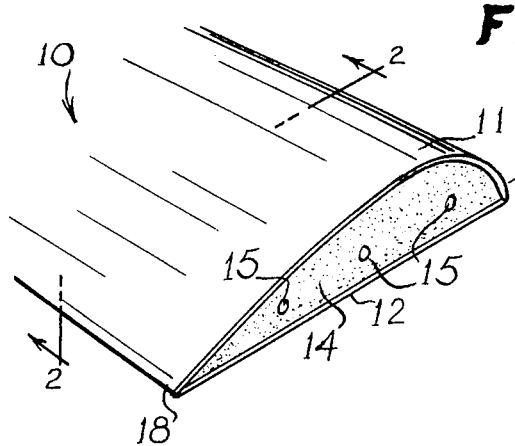
FIG. 1
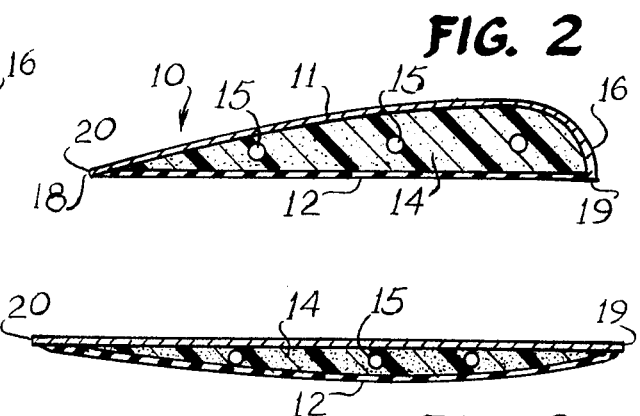
FIG. 2
FIG. 3
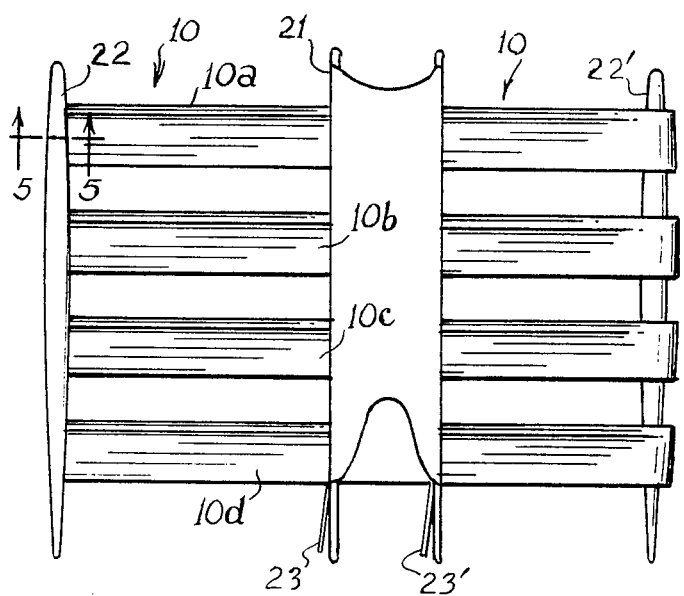
FIG. 4
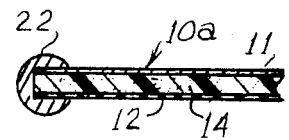
FIG. 5
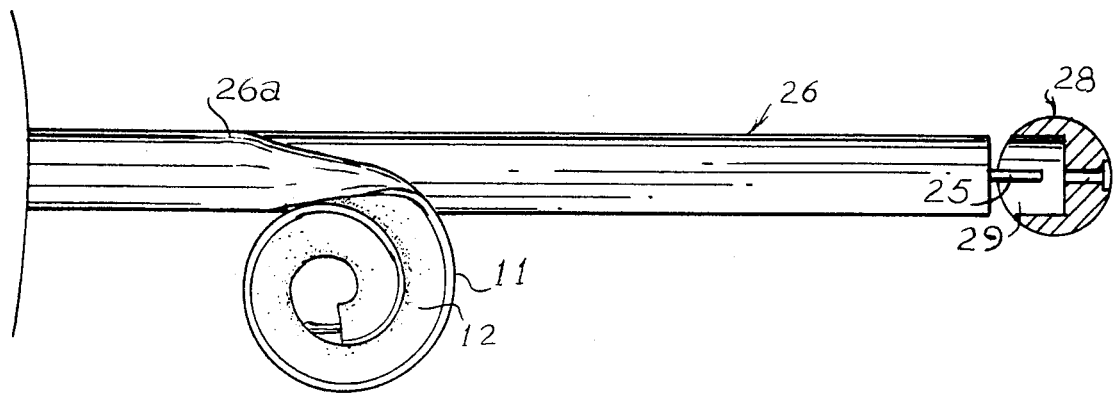
FIG. 6 ial that readily suggests itself is an aluminum sheet, the
ROLLABLE AIRFOIL

INFORMATION DISCLOSURE STATEMENT

Airfoils have been constructed of many different materials, the objectives being largely to achieve the strength characteristics required, along with light weight. Though past efforts were largely directed towards achieving the proper shape for the desired air flow and lift characteristics, the cambered design has now become well established as the most desirable design for airplane wings and the like.

There has been some prior effort towards providing an aircraft that can be stored in a relatively small space, but such previous efforts have generally taken the form of simply folding the wings, or of removing the wings. These arrangements tend to require extensive mechanical apparatus in an effort to make the wings easily foldable or removable while retaining the necessary strength. There is a glider arrangement that can be stored in a small space, but this is in the nature of a parachute made of fabric, with all the attendant difficulties of proper opening when the device is to be used, and control during use.

SUMMARY OF THE INVENTION

This invention relates generally to airfoils, and is more particularly concerned with a rollable airfoil wherein the airfoil has sufficient integrity to maintain its shape when in use, but is such as to be rolled into a coil for storage.

The present invention provides an airfoil that may have the conventional cambered shape, the airfoil including an upper skin formed of a material having good dimensional stability and a lower skin formed of a stretchable material. The upper skin is formed into the cambered shape while the lower skin tends to urge the upper skin towards the cambered shape; and, the upper skin can be deformed to have a straight line in a front-to-rear direction so the upper skin can be rolled, the lower skin being sufficiently stretchable to remain attached to the edges of the upper skin. Between the upper skin and the lower, there may be a light weight filler material, primarily for the purpose of dampening vibrations of the lower skin.

BRIEF DESCRIPTION OF THE DRAWINGS

These and other features and advantages of the present invention will become apparent from consideration of the following specification when taken in conjunction with the accompanying drawings in which:

FIG. 1 is a fragmentary perspective view showing a portion of an airfoil made in accordance with the present invention;

FIG. 2 is an enlarged cross-sectional view taken substantially along the line 2—2 in FIG. 1;

FIG. 3 is a view similar to FIG. 2, but showing the upper skin flattened so the airfoil is rollable;

FIG. 4 is a top plan view illustrating one form of aircraft that may be made utilizing airfoils of the present invention;

FIG. 5 is a cross-sectional view taken substantially along the line 5—5 in FIG. 4; and, FIG. 6 is a rear elevational view illustrating an airfoil arrangement for use on a relatively large aircraft.

DETAILED DESCRIPTION OF THE EMBODIMENTS

Referring now more particularly to the drawings, and to those embodiments of the invention here presented by way of illustration, it will be seen in FIG. 1 of the drawings that the airfoil generally designated at 10 includes the upper skin 11 and the lower skin 12. The upper skin 11 is cambered to provide the desired airfoil shape, while the lower skin 12 is generally flat to complete the usually desired airfoil configuration. Between the two skins 11 and 12, there is here shown an expanded plastic or the like designated at 14, and including a plurality of tubes or the like 15.

Looking at FIG. 2 of the drawings, it will be seen that the airfoil 10 has a leading edge 16 and a trailing edge 18. The leading edge 16 is formed by the downwardly turned end of the upper skin 11, the edge of the upper skin 11 being indicated at 19. The upper skin 11 rises to the maximum height, and tapers downwardly to the trailing edge, terminating in an edge designated at 20.

It will be seen in FIG. 2 of the drawings that the lower skin 12 comprises a generally straight line in a front-to-rear direction, extending from the edge 19 to the edge 20. Those skilled in the art will understand that the conventional airfoil includes a rise towards the forward portion of the airfoil, the rise being a generally smooth curve to allow smooth airflow over the leading edge 16 of the airfoil. At the same time, the bottom surface of the airfoil is flat is allow smooth flow lines along the bottom surface. The result is the creation of a low pressure area acting on the curved upper surface of the airfoil to provide lift.

Looking at FIG. 2 of the drawings, it will be seen that the material 14 is here indicated as an expanded plastic. Those skilled in the art will understand that numerous materials will serve quite well since the primary object is to dampen vibrations of the lower skin 12 and to give some resistence to bending of the lower skin 12 during use of the airfoil. By way of illustration, one might use a polyether based polyurethane, though numerous other materials will suggest themselves to those skilled in the art.

It will also be seen in FIG. 2 of the drawings that the tubes 15 extend through the airfoil 10, and these may be flexible plastic tubes, as for carrying fluids or the like, control cables such as convention Bowden wires, or the tubes 15 may comprise simply electrical cables for lights or other devices mounted outboard of the wing.

The upper skin 11 of the airfoil of the present invention may be made of any of several materials. One material that readily suggests itself is an aluminum sheet, the sheet being of an alloy having low malleability and rather high elasticity so the sheet can be formed into the desired shape, and the sheet will tend to retain that shape, and will tend to return to that shape after deformation. Those skilled in the art will also understand that a thin steel sheet may be used, or a plastic material reinforced with fibers such as glass, graphite or other commonly used fibers. It has been found that either an epoxy resin or a polyester resin, reinforced with glass fibers, can be appropriately formed and will have the desired elasticity to allow the function described herein.

The bottom skin 12 is preferably a sheet of rubber or other comparable elastomeric material. The bottom skin 12 must elongate sufficiently when the upper skin 11 is deformed, and the lower skin 12 must exert some force between the edges 19 and 20 to assist in retaining the shape of the upper skin 11. The thickness of the lower skin 12 may vary to yield greater strength at one end of the airfoil than at the other.

Looking now at FIG. 3 of the drawings, the airfoil is shown with the upper skin 11 flattened into a straight line. It will be understood that the cambered shape of the upper skin 11 will give the skin 11 great resistance to bending; however, once the camber is "broken", the flat material will be relatively easy to bend.

Looking further at FIG. 3 of the drawings, it will be seen that, since the upper skin 11 has been made straight, the ends 19 and 20 will be farther apart, requiring that the lower skin 12 extend farther to remain attached to the edges 19 and 20. Since the lower skin 12 is a stretchable elastomeric material, the lower skin 12 can deform appropriately. Also, it will be seen that the filler material 14 will become somewhat flattened due to the stresses exerted by the flattening of the upper skin 11 and the attempt of the lower skin 12 to extend in a straight line from the edge 19 to the edge 20. Thus, while the airfoil will always have some substantial thickness, it will be seen that, when the airfoil is shaped somewhat as shown in FIG. 3 of the drawings, the airfoil can be rolled about an axis parallel to the straight line of the upper skin 11 shown in FIG. 3 of the drawings.

It will be readily apparent that an airfoil as shown in FIGS. 1-3 will not have great strength as may be required on a large aircraft designed for high speed operation. Nevertheless, it is contemplated that the airfoil will be extremely useful on smaller aircraft designed for slow speed operation, and including a glider arrangement, perhaps for one person. FIG. 4 shows a stop plan view of a one-person glider utilizing four airfoils on each side.

It will be recognized that an airfoil made in accordance with the present invention will have sufficient strength to resist bending so the airfoil can support the load, but such an airfoil will have a tendency to warp. To prevent warping of the airfoil, it is contemplated that the airfoils such as the airfoils 10a in FIG. 4 will be attached at their inboard end to the fuselage 21, and at their outboard end to a boom 22 or the like. In FIG. 4, it will be seen that there are airfoils 10a, 10b, 10c and 10d spaced apart from the front to the rear of the fuselage 21. Since all four of the airfoils 10 are attached to the fuselage 21 and to the boom 22, it will be understood that the airfoils 10 are held from warping.

Looking at the righthand side of FIG. 4, it will be seen that the airfoils 10 can be stored by forcing the boom 22' to rotate, thereby "breaking" the camber of the airfoils 10 and allowing the airfoils to be rolled around the boom 22'.

FIG. 5 of the drawings indicates the attachment of the boom 22 to the airfoil 10a. It will here be seen that the boom 22 can be forceably rotated, and the camber of the upper skin will be broken to allow the airfoil to be rolled.

In an arrangement such as that shown in FIG. 4, those skilled in the art will also understand that the angle of successive airfoils 10a, 10b etc. must be adjusted for the pattern of the air flow leaving the previous airfoil. Also, some form of rudder 23, 23', will be necessary for control. These things are well known to those skilled in the art, and no further discussion is thought to be necessary.

It is contemplated that the airfoil of the present invention may be used on aircraft large enough that the arrangement shown in FIG. 4 would not be practicable, in that the force of all of the airfoils would be too much to roll simultaneously. FIG. 6 illustrates a modified arrangement for use on such aircraft. In FIG. 6 it will be seen that there is a shaft 25 extending from the airfoil 26, the shaft 25 extending into the boom 28. The boom 28 also includes a cavity 29 for receiving the end of the airfoil 26. Thus, the boom 28 can be placed over the end of the airfoil 26, and the shaft 25 extends through the boom 28 to receive a fastener. It will be understood that a plurality of airfoils will be received in the boom 28 to provide an arrangement similar to that shown in FIG. 4 of the drawings. In the arrangement shown in FIG. 6, however, the fastening means could be released so the boom 28 will be removed from the end of all of the airfoils such as the airfoil 26; then, each airfoil 26, 26a etc. can be rolled individually. In FIG. 6, it will be seen that the airfoil designated at 26a has been partially rolled.

It will of course be understood that the rod 25 may comprise one of the tubes such as the tube 15, or can simply be a separate fastening means if desired.

It will therefore be seen that the present invention provides a highly desirable airfoil that would be light in weight, and would provide sufficient strength for a relatively small aircraft, expecially when the airfoil is used in multiples as is indicated in the apparatus shown in FIG. 4 and FIG. 6. Numerous materials may be used for the upper skin 11, so long as the desired strength and elasticity are provided for, and numerous fillers may be used, so long as the filler is relatively light in weight and deformable to allow the rolling. As herein contemplated, the upper skin 11 of the airfoil will have a tendency to unroll, to assume the airfoil shape. Thus, some effort will be required to roll the airfoil, and the airfoil will unroll itself when released.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as defined in the appended claims.

I claim:

1. A rollable airfoil comprising an upper skin preshaped into a cambered configuration, said upper skin being formed of a first material having sufficient elasticity to return to its cambered shape after deformation, a lower skin extending in a generally straight line from a forward edge of said upper skin to a rearward edge of said upper skin to provide a generally planar lower surface for said airfoil, said lower skin being formed of a second material, said second material being a generally elastomeric material, said lower skin being fixed to said upper skin for forming an integral airfoil, said second material being stretched to extend from said forward edge to said rearward edge for exerting a force on said upper skin, said force on said upper skin being in a direction to maintain said cambered configuration of said upper skin.

2. An airfoil as claimed in claim 1, said upper skin being deformable by straightening said cambered configuration and further stretching said lower skin for providing a straight line from said forward edge to said rearward edge, said airfoil being rollable about an axis parallel to said straight line.

3. An airfoil as claimed in claim 2, and further including a filler material between said upper skin and said lower skin, said filler material comprising a resilient foam.

4. An airfoil as claimed in claim 3, and further including a plurality of tubes extending through said filler material.

5. An airfoil as claimed in claim 4, said upper skin being formed of a material selected from the group consisting of aluminum, steel, fiber glass reinforced epoxy resin, and fiber glass reinforced polyester resin.

6. An aircraft having a fuselage, rudder means for lateral control of said aircraft, a first plurality of airfoils on one side of said fuselage and a second plurality of airfoils on the other side of said fuselage, each airfoil of said first plurality and said second plurality of airfoils comprising an upper skin preshaped into a cambered configuration and a lower skin defining a planar lower surface, said lower skin being a stretched elastomeric material exerting a force to urge said upper skin towards said cambered configuration for providing rigidity in said airfoils, a first boom fixed to the outboard ends of said first plurality of airfoils to prevent warping of said first plurality of airfoils, and a second boom fixed to the outboard ends of said second plurality of airfoils to prevent warping of said second plurality of airfoils.

7. An aircraft as claimed in claim 6, said upper skin being deformable by straightening said cambered configuration and further stretching said lower skin for providing a straight line from the front edge of said airfoil to the rear edge of said airfoil, said straight line being parallel to said first boom and said second boom, the arrangement being such that said first boom acts as a core for rolling said first plurality of airfoils, and said second boom acts as a core for rolling said second plurality of airfoils.

8. An aircraft as claimed in claim 6, said upper skin being deformable by straightening said cambered configuration and further stretching said lower skin for providing a straight line from the front edge of said airfoil to the rear edge of said airfoil, said airfoil being rollable about an axis parallel to said straight line, said first boom and said second boom being selectively removable from said first plurality and said second plurality of airfoils for allowing said each airfoil to be rolled individually.

* * * * *